United States Patent [19]

Shapiro

[11] 4,428,584
[45] Jan. 31, 1984

[54] PISTON ROD SEAL FOR A STIRLING ENGINE

[75] Inventor: Wilbur Shapiro, Schenectady, N.Y.

[73] Assignee: Mechanical Technology Incorporated, Latham, N.Y.

[21] Appl. No.: 354,018

[22] Filed: Mar. 2, 1982

[51] Int. Cl.³ .............................................. F16J 15/56
[52] U.S. Cl. .......................................... 277/3; 277/27
[58] Field of Search ......................... 277/3, 27, 15, 29

[56] References Cited

U.S. PATENT DOCUMENTS 3,848,877 11/1974 Bengtsson et al. ..................... 277/3
4,146,237 3/1979 Bergman ................................ 277/3

Primary Examiner—Robert I. Smith
Attorney, Agent, or Firm—Kane, Dalsimer, Kane, Sullivan & Kurucz

[57] ABSTRACT

In a piston rod seal for a Stirling engine, a hydrostatic bearing and differential pressure regulating valve are utilized to provide for a low pressure differential across a rubbing seal between the hydrogen and oil so as to reduce wear on the seal.

7 Claims, 3 Drawing Figures

PISTON ROD SEAL FOR A STIRLING ENGINE

The Government of the United States of America has rights in this invention pursuant to Contract No. DEN3-32 awarded by U.S. Department of Energy.

FIELD OF THE INVENTION

The invention relates to improvements on a Stirling engine particularly an improved piston rod seal for a Stirling engine.

BACKGROUND OF THE INVENTION

Presently there has become a revitalized interest in the Stirling engine in an attempt to improve its efficiency, cost and size. A basic Stirling engine design for example involves a piston/cylinder arrangement wherein a piston is driven by the use of hot and cold working gas. The gas is compelled to move from a cold space to a hot space continually and when the gas is hot it expands and pushes the piston in a first direction and when it is cold it is compressed by the piston moving back in the opposite direction to its original position.

Generally, the piston may be connected to a piston rod which in turn connects to a crosshead. This crosshead may then be coupled to a crankshaft which is to be rotationally displaced by the reciprocating movement of the piston. An improvement on this basic concept for converting between rotary and the reciprocating motion of the piston is disclosed in commonly assigned U.S. patent application Ser. No. 246,664 entitled Variable Stroke Swash Plate filed Mar. 23, 1981 for example.

However, a basic feature of the piston/rod relationship is to provide a sealing off of the chamber from the crosshead during operation of the engine. This becomes especially important due to the high pressures (approximately 1500 psi) involved in the cylinder and the use of hydrogen as a working gas.

There presently exists a piston rod seal which isolates the cylinder chamber from the crosshead during operation of the engine which is manufactured by Kommanditbolage United Stirling AB and Company (Sweden). This piston rod seal is depicted in FIG. 1 (labelled "prior art") wherein a piston 10 is shown disposed in a cylinder 12 and coupled to a piston rod 14 which in turn connects to a crosshead 16. A piston seal 18 is provided between the crosshead and the piston and is disposed about the piston rod. A compartment 20 is defined between the seal and piston containing hydrogen at a fluctuating pressure which varies during operation of the engine but is generally above 1500 psi. A rubbing seal 22 is provided which separates compartment 20 from another compartment 24 which is pressurized at approximately the minimum pressure in the system (1500 psi). Another rubbing seal 26 is provided separating compartment 24 from the crankcase 28 containing oil or other lubricant therein, with a scraper 30 preventing a build up of oil on the piston rod. Seal 26 and scraper 30 are spring loaded against the piston rod to enable their effective use.

A problem with the aforenoted arrangement is that the hydrogen-to-oil seal 26 which is continually spring loaded against the piston rod wears and the resulting deterioration causes a contamination of the hydrogen by the oil. This adversely affects the operation of the engine, shortens its usuable life period and require relatively frequent replacement resulting in expense and down time for the engine. There exists a need for a piston rod seal which provides for effective sealing while eliminating the wearing problems heretofore realized.

SUMMARY OF THE INVENTION

It is a principal object of the invention to provide for a piston rod seal for use in a Stirling engine, which reduces wear on the seal and thereby increases the life thereof.

It is a further object to provide for such a seal which also serves to maintain the concentricity of the piston rod as it reciprocates.

The present invention provides a piston rod seal which utilizes a hydrostatic bearing which serves to supply pressure to the oil side of the hydrogen-to-oil seal at a pressure level slightly less than the pressure of the hydrogen so that there is a very slight pressure drop across the seal. In this regard, a chamber is provided intermediate on the oil side of the seal and coupled to a differential regulating valve which is also coupled to a chamber on the hydrogen side of the seal. This valve senses the pressure on the hydrogen side of the seal and keeps the pressure on the oil side thereof slightly below it so as to prevent the ingress of oil into the hydrogen chamber. Because of the low pressure difference, the seal does not have to be squeezed against the piston rod as heretofore done, and can therefore expect to have a much greater useful life than the rubbing seal noted earlier.

Furthermore, the use of the hydrostatic bearing provides for maintenance of the concentricity of the piston rod as it reciprocates by providing a restoring force thereon.

BRIEF DESCRIPTION OF THE DRAWINGS

These and other objects and advantages will be realized by the present invention, the discussion of which should be taken in conjunction with the drawings wherein:

FIG. 3 is a graphic representation of the pressure distribution in the hydrostatic bearing incorporating the piston rod seal of the present invention.

DETAILED DESCRIPTION OF THE PREFERRED EMBODIMENT

Figure 1:
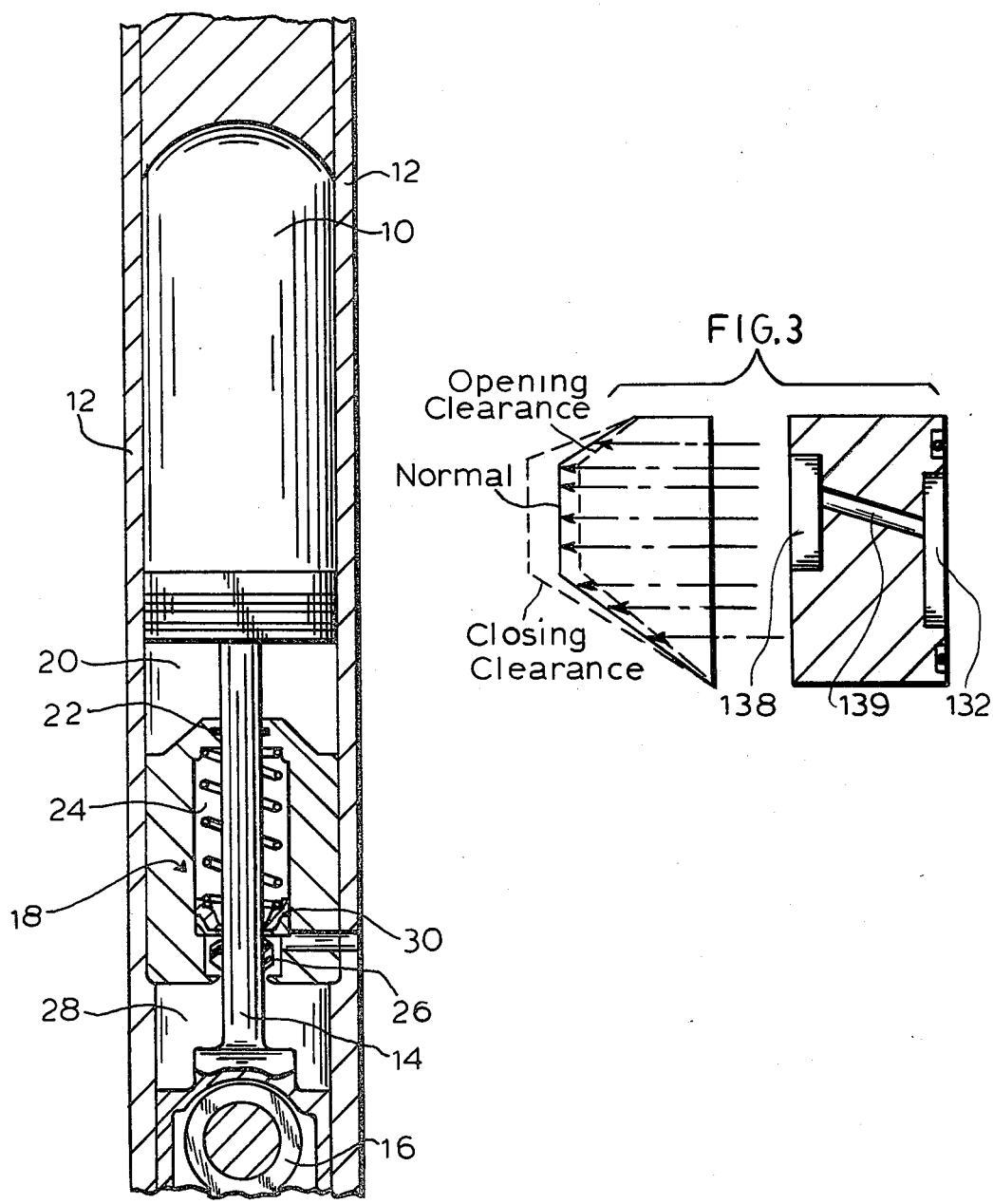
FIG. 1 is a partly sectional view of a piston/cylinder arrangement and piston rod seal therefore for use in a Stirling engine as found in the prior art.
Figure 2:
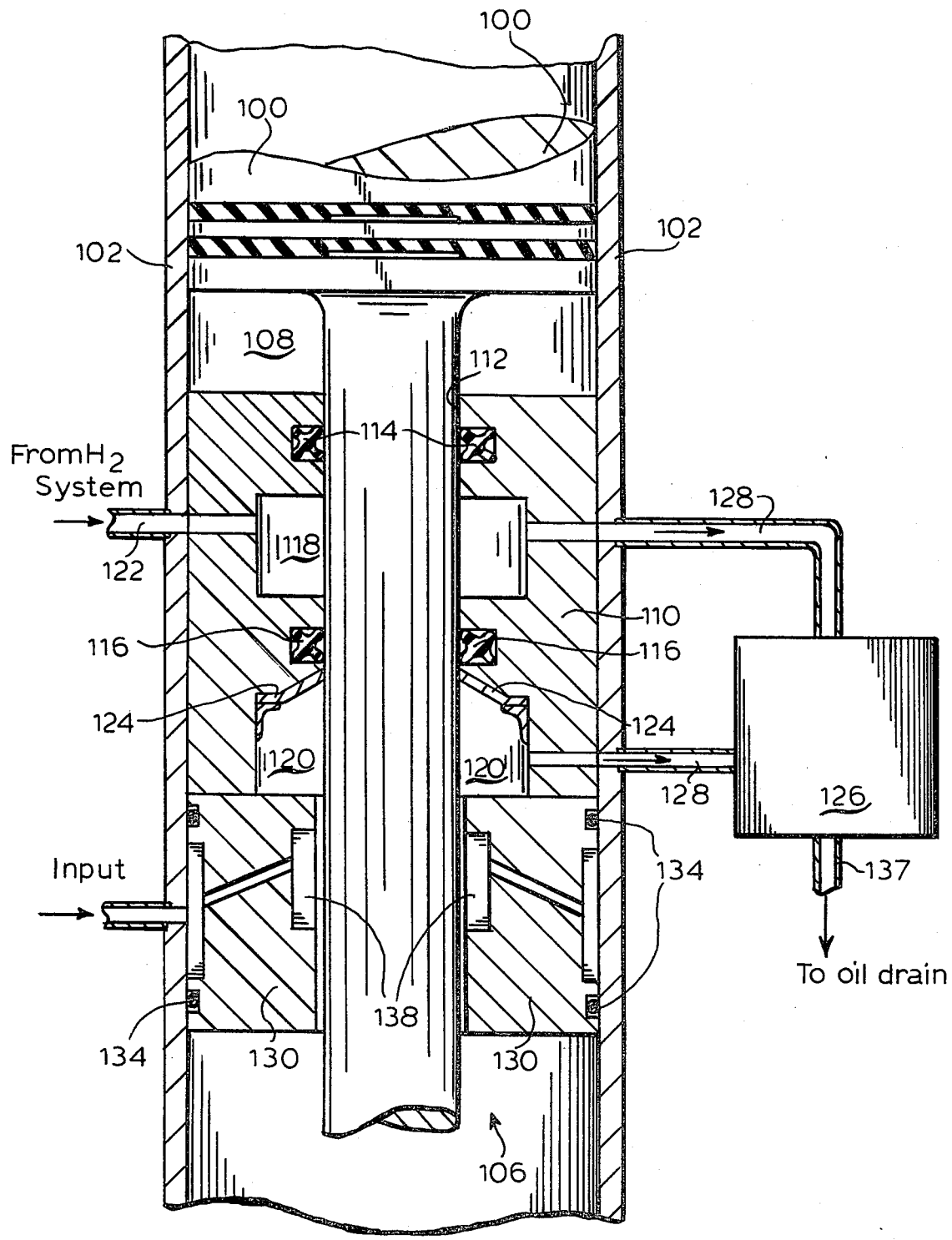
FIG. 2 is a partly sectional view of a piston/cylinder arrangement for use in a Stirling engine incorporating the piston rod seal of the present invention.

With reference now to FIG. 2 there is shown a somewhat enlarged view of a Stirling engine piston 100 disposed in a cylinder 102 having its piston rod 104 disposed through a piston rod seal 106, encircling the rod. The piston 100 is intended to reciprocate in the cylinder 102, in accordance with well known Stirling engine principles and in this regard below the piston 100 there is provided a chamber 108 containing a working gas such as hydrogen for example, at a fluctuating pressure (usually above 1500 psi) which varies as a result of the movement of the piston 100. As the piston 100 reciprocates, the piston rod 104 likewise reciprocally moves within a piston rod seal 106.

As can be seen in FIG. 2, the piston rod seal 106 includes a body portion 110 disposed in the cylinder 102 at tolerances that prevent the leaking of material therebetween. An axial bore 112 is provided through the body 110 for the rod 104.

Positioned in the bore 112 are axial rubbing seals 114 and 116 along with annular chambers 118 and 120 adjacent thereto. Chamber 118 is intended to be coupled with a source of hydrogen to provide a hydrogen control chamber and is pressurized at about the minimum pressure in the system providing a steady pressure therein of about 1500 psi via inlet channel 122 which passes through the cylinder 102 and body 110.

Chamber 120 provides an oil control chamber and includes a scraper 124 mounted therein that prevents the oil from accummulating on the piston rod 104. A differential regulating valve 126 is also provided and coupled to chambers 118 and 120 via outlet channels 128.

Rubbing seal 114 is disposed between chambers 108 and 118 and provides sealing between the hydrogen present in the respective chambers. Rubbing seal 116 is positioned between chamber 118 and 120 and accordingly provides a sealing between hydrogen and oil. The pressure is maintained on the oil side by a hydrostatic bearing 130 which is provided with an oil inlet channel/recess arrangement 132 coupled to an oil pump (not shown). Appropriate annular sealing rings 134 are provided on bearing 130 and an axial bore 136 is positioned therethrough to accept the piston rod 104.

In operation, the external high pressure pump supplying the oil to the hydrostatic bearing 130 should do so at a sufficiently high supply pressure such that the pressure in recesses 138 is slightly above the oil pressure in chamber 120, the amount of which is regulated by valve 126. The differential regulating valve 126 senses the hydrogen pressure in chamber 118 (i.e., 1500 psi) and causes the oil pressure on the other side of seal 116 in chamber 129 to be maintained slightly below the pressure in chamber 118. Note that the valve 126 is provided with an oil drain 137 to drain off oil. Accordingly, the pressure drop across the seal 116 is at a very low level which, as compared to spring and full pressure drop hydraulic loading it against the piston, increases the life of the seal 116 by reducing the wear on the seal.

Note that the hydrostatic bearing 130 also serves to maintain concentricity of the piston rod 104. This can be seen in FIG. 3 wherein the pressure distribution of the bearing 130 is shown. The pressure increases or decreases depending upon whether the clearance under the recess 138 of the channel/recess arrangement 134 increases or decreases respectively. This causes to be produced a restoring force on the piston rod 104 to maintain its concentricity. The recesses 138 are generally separated around the circumference of the bearing so that there is little short circuiting between high and low pressure regions. Also, the recesses are fed from the inlet annulus 132 through individual restrictions 139 (one per recess), which usually takes the form of a Capillary or orifice restrictor.

It should be noted that the particular embodiment aforenoted may be readily modified to utilize a hydrostatic bearing which acts as a crosshead bearing as well as providing a control oil pressure to chamber 120, with appropriate modifications.

Thus the aforenoted objects and advantages are realized by the herein described invention and although a preferred embodiment has been disclosed and described in detail herein, its scope should not be limited thereby, rather its scope should be determined by that of the appended claims.

What is claimed is:

1. For use in association with a piston rod in sealing a piston in a cylinder, a piston rod sealer comprising:
   a sealing means having two opposite sides, a first side of which is exposed to a first pressurized fluid and a second side of which is exposed to a second pressurized fluid, said sealing means being adapted to have a piston rod passing therethrough;
   a pressurized means adapted to supply the second pressurized fluid to the second side of said sealing means; and
   a differential regulating valve means coupled to each side of said sealing means and capable of removing high pressure differentials therebetween during operation of the piston so as to inhibit leakage past the sealing means.

2. The invention in accordance with claim 1 wherein said pressurizing means is a hydrostatic bearing.

3. The invention in accordance with claim 2 wherein the hydrostatic bearing includes means capable of maintaining concentricity of the piston rod in said piston rod sealer during movement of the piston.

4. The invention in accordance with claims 1, 2 or 3 which includes a first chamber operationally exposed to the first side of said sealing means, a second chamber operationally exposed to the second side of said sealing means, and said valve being coupled to said chambers and capable of regulating the pressure differential therebetween.

5. The invention in accordance with claim 4 where, in operation, said first chamber receives the first pressurized fluid is hydrogen, and said second chamber receives the second pressurized fluid which is a lubricant.

6. The invention in accordance with claim 5 which includes scraper means maintained in said second chamber which prevents lubricant from accummulating on the piston rod.

7. The invention in accordance with claim 1 wherein said regulating valve means regulates the pressure of the second pressurized fluid slightly below that of the first pressurized fluid.

* * * * *